United States Patent
Kramer, Jr. et al.

(10) Patent No.: US 9,506,589 B2
(45) Date of Patent: Nov. 29, 2016

(54) APPARATUS AND METHOD FOR POSITIONING FLEXIBLE TUBING IN ALIGNMENT WITH VEHICLE EXHAUST PIPE

(71) Applicant: CRUSHPROOF TUBING COMPANY, McComb, OH (US)

(72) Inventors: Vance M. Kramer, Jr., Perrysburg, OH (US); Jacob D. Altstaetter, Maumee, OH (US)

(73) Assignee: Crushproof Tubing Company, McComb, OH (US)

( * ) Notice: Subject to any disclaimer, the term of this patent is extended or adjusted under 35 U.S.C. 154(b) by 495 days.

(21) Appl. No.: 13/908,358

(22) Filed: Jun. 3, 2013

(65) Prior Publication Data

US 2013/0320669 A1    Dec. 5, 2013

Related U.S. Application Data

(60) Provisional application No. 61/655,589, filed on Jun. 5, 2012.

(51) Int. Cl.
*F16L 33/00*      (2006.01)
*F01N 13/18*      (2010.01)
*F01N 13/20*      (2010.01)

(52) U.S. Cl.
CPC ........... *F16L 33/00* (2013.01); *F01N 13/1822* (2013.01); *F01N 13/20* (2013.01)

(58) Field of Classification Search
CPC ..... F01N 13/1822; F01N 13/20; F16L 33/00
USPC ........................................................ 285/62
See application file for complete search history.

(56) References Cited

U.S. PATENT DOCUMENTS

| | | | |
|---|---|---|---|
| 2,023,263 A * | 12/1935 | Blume | B08B 15/00 104/52 |
| 2,733,668 A * | 2/1956 | Pfetzing | B08B 15/002 104/52 |
| 2,754,138 A | 10/1956 | Kramer | |
| 2,789,841 A | 4/1957 | Kramer | |
| 2,832,096 A | 4/1958 | Kramer | |
| 4,108,342 A * | 8/1978 | Riva | B60P 7/0807 224/318 |
| 4,308,228 A | 12/1981 | Kramer, Sr. et al. | |
| 4,804,019 A | 2/1989 | Kramer, Jr. | |
| 5,362,273 A * | 11/1994 | Pfeiffer, Jr. | B08B 15/002 454/63 |
| 5,435,962 A | 7/1995 | Kramer, Jr. | |
| 5,518,447 A * | 5/1996 | Nordin | F16L 3/015 104/52 |
| 5,791,980 A * | 8/1998 | Kramer, Jr. | F23J 11/02 285/302 |
| 5,911,623 A * | 6/1999 | Trana | B08B 15/002 138/89 |

(Continued)

*Primary Examiner* — Daniel P Stodola
*Assistant Examiner* — Zachary Dragicevich
(74) *Attorney, Agent, or Firm* — Rankin, Hill & Clark LLP

(57) ABSTRACT

An apparatus and method for positioning a length of flexible tubing in alignment with the exhaust pipe of an automotive vehicle located in an enclosed space. The apparatus includes a length of flexible tubing having an adapter or boot at its inner end. The boot is adapted to be positioned in operative alignment with the exhaust pipe to receive the exhaust gases therefrom and to direct them through the length of flexible tubing. A suction cup is secured to the rear bumper of the vehicle in the vicinity of the end of the exhaust pipe and a length of cord is connected between the boot and the suction cup. The cord is tightened and retained in a tensioned condition by means of a gripping device or keeper. This causes the boot to be retained in an operatively aligned position relative to the exhaust pipe.

6 Claims, 5 Drawing Sheets

(56) References Cited

U.S. PATENT DOCUMENTS 6,102,078 A     8/2000   Kramer, Jr.
7,273,413 B2 *   9/2007   Frink .................... B08B 15/002
                                                                           285/62

2003/0209880 A1 *   11/2003   Koestler ................ B60D 1/36
                                                                             280/477
2010/0096520 A1 *   4/2010   Houlihan ............... A47F 9/045
                                                                             248/206.2

* cited by examiner

APPARATUS AND METHOD FOR POSITIONING FLEXIBLE TUBING IN ALIGNMENT WITH VEHICLE EXHAUST PIPE

BACKGROUND OF INVENTION

1. Field of Invention

The present invention relates to systems for conveying engine exhaust gases from an automobile engine located in an enclosed work space and discharging the gases into the atmosphere outside the enclosed work space. More particularly, the invention relates to systems in which a length of flexible tubing is connected at its inner end to an engine exhaust pipe to convey exhaust gases to its outer or downstream end from where the gas is discharged to outside atmosphere.

2. Description of Related Art

When automotive vehicle engines are operated at various types of servicing facilities such as garages, repair shops, automotive dealerships etc., potentially harmful combustion products are produced and discharged through one or more vehicle exhaust pipes. Since the engine being serviced is usually located in an enclosed work space, these gases must be removed by conveying them out of the work area and discharging them into the atmosphere outside the enclosed work space.

Some systems employ a network of conduits either buried in the concrete floor of the service facility or suspended overhead. The engine exhaust pipe or pipes are connected to these conduits through lengths of flexible tubing. In other arrangements, the engine exhaust is conveyed through a separate conduit in the form of a length of flexible tubing that extends through a wall or door panel so as to discharge the gases to outside atmosphere. Flexible tubing that is suitable for such purposes is disclosed in U.S. Pat. Nos. 2,832,096; 4,308,228; 5,435,962; and 6,102,078, for example. This type of flexible tubing is crush resistant and is formed of elastomeric material that is initially in an uncured condition. When the uncured product is formed and cured, it provides a strong but flexible length of tubing with helical corrugations along its length.

Briefly, the method for making the tubing comprises sliding an extruded sleeve of uncured rubber axially over a rotatable mandrel, the mandrel having a continuous thread formed on its outer surface. When in place on the mandrel, the sleeve is forced into the helical groove or root of the thread by a length of cord wrapped around the sleeve as the sleeve rotates with the mandrel. This serves to impart a desired corrugated shape to the uncured rubber sleeve. The resulting assembly is then removed from its support and placed in an oven or autoclave to cure the rubber and set the helical corrugations. The cord is then removed from the tubing and the tubing is removed from the mandrel. The overall method thus described is generally known as the "cording" process.

In order to connect the inner end of the flexible tubing to the vehicle exhaust pipe or pipes, the length of flexible tubing generally has an adapter or boot secured to its inner end. Adapters or boots for this purpose are disclosed, for example, in U.S. Pat. Nos. 2,754,138; 2,789,841; and 4,804,019. Generally the adapter or boot is flared outwardly to define an enlarged opening. This permits the boot to be slid over the end of the exhaust pipe in a fairly loose fitting condition. Then the boot is tightened around the exhaust pipe using, for example, one of the techniques shown in the above U.S. Pat. Nos. 2,754,138; 2789,841; and 4,804,019.

To provide further assurance that the boot will remain on the exhaust pipe, a chain with a hook at one end is often connected between the boot and a connection point located in the undercarriage of the vehicle. The chain is connected so as to urge the boot into secure engagement with the exhaust pipe.

A new development, however, has made the positioning of the boot in alignment with the exhaust pipe more difficult. More particularly, some newer motor vehicle designs, instead of having the exhaust pipe under the rear bumper, now have the exhaust pipe positioned in an opening in the bumper or other rear panel, well above the bottom of the bumper. In some cases the end of the exhaust pipe is flush with the surface of the bumper. With this new exhaust pipe discharge location, the standard practice of sliding the boot over the end of the exhaust pipe and connecting a hook and chain from the boot to the undercarriage of the vehicle is not workable. Thus a need exists for an alternative approach to positioning the boot in alignment with the exhaust pipe.

The apparatus and method of the present invention satisfy the need described above and afford other features and advantages heretofore not obtainable.

BRIEF SUMMARY OF THE INVENTION

In accordance with the apparatus and method of the invention, an end of a length of flexible tubing is positioned in alignment with the exhaust pipe of an automotive vehicle located in an enclosed work space. The exhaust pipe discharges exhaust through an opening in the vehicle's rear bumper or other rear portion of the vehicle above the undercarriage of the vehicle. This arrangement serves to conduct exhaust gases from the exhaust pipe, through the opening in the rear bumper to the length of flexible tubing. The length of tubing has an adapter or boot at its inner end that may be positioned in contact with the rear bumper or other portion of the vehicle surrounding the opening through which exhaust gases are discharged and in operative alignment with the exhaust pipe. Accordingly, the boot is adapted to receive exhaust gases from the exhaust pipe and direct them to and through the length of flexible tubing. A suction cup is secured to a rear of the vehicle in a location above the end of the exhaust pipe and a length of cord is connected between the boot and the suction cup. The cord is tightened and retained in a tensioned condition by means of a gripping device or keeper. This enables the boot to be securely positioned relative to the exhaust pipe. The suction cup has a vacuum chamber and may include a manually operated pump to assist in producing and maintaining at least a partial vacuum in the chamber.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
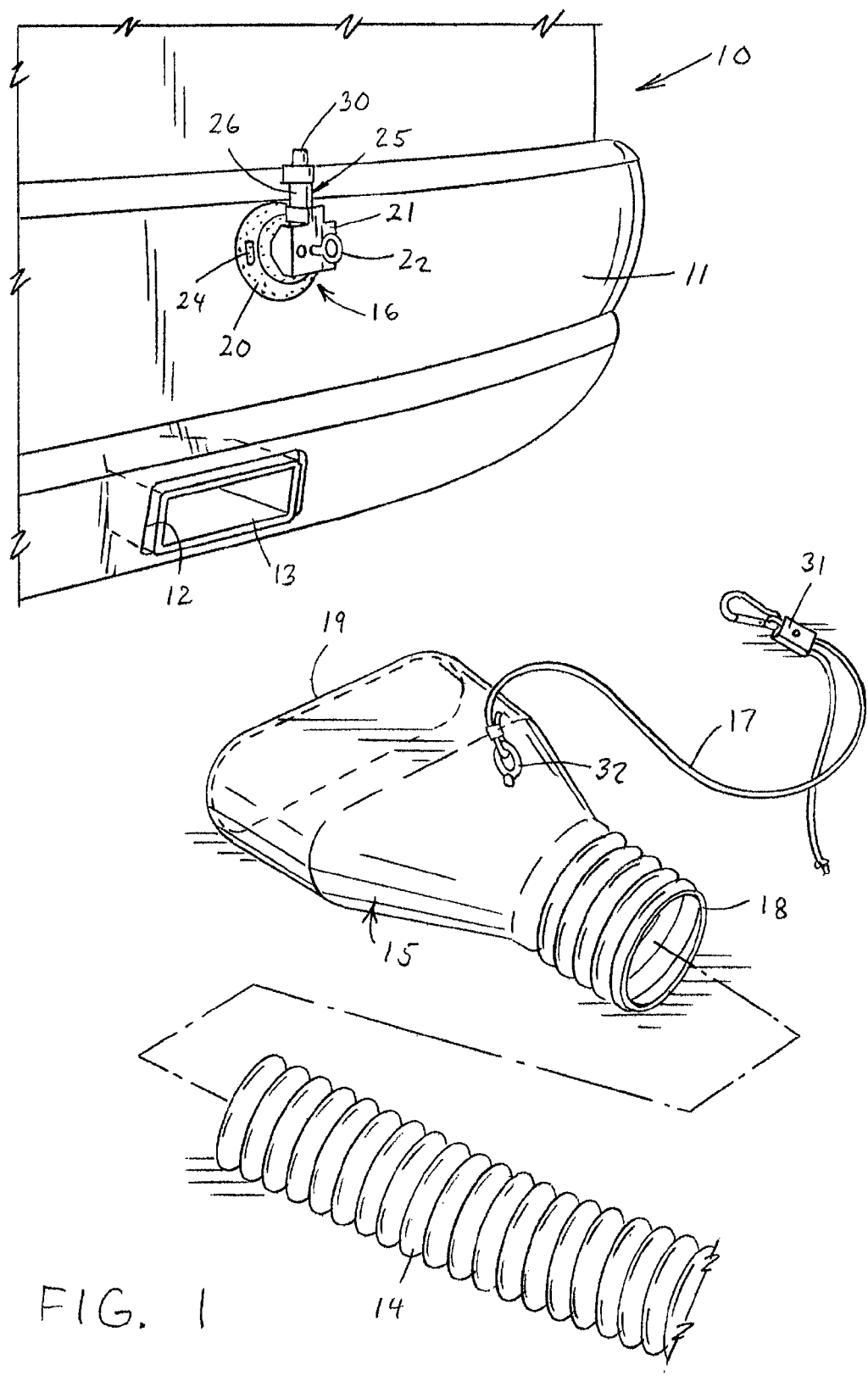
FIG. 1 is a perspective view showing a rear portion of an automotive vehicle, wherein an exhaust pipe from the vehicle's engine is located in an opening in the rear bumper, and the various components of an exemplary apparatus according to the invention including a suction cup device, which is affixed to the vehicle's rear bumper, an adapter and a partial length of flexible tubing.

Referring initially to FIGS. 1-4 of the drawings, the apparatus and method of the invention are shown and described in connection with an automotive vehicle 10 located in an enclosed work space and having a rear bumper 11 with an opening 12 for at least one exhaust pipe 13. The opening 12 is located above the undercarriage of the vehicle and the end of the exhaust pipe 13 is generally flush with the surface of the bumper 11. In the embodiment shown the outer end of the exhaust pipe 13 has a rectangular shape. But the invention can be utilized with exhaust pipes having other shapes (e.g., circular or multiple adjacent exhaust pipes). It will be appreciated that the exhaust pipe could, in some vehicles, extend through a rear portion of the vehicle other than a bumper (e.g., a skirt).

A length 14 of crush resistant flexible tubing with helical corrugations is used to convey exhaust gases from the exhaust pipe 13 to the atmosphere outside the enclosed work space when the vehicle engine is running. The length 14 of tubing can be made in accordance with U.S. Pat. Nos. 2,832,096; 4,308,228; 5,435,962; and 6,102,078. The length 14 of tubing is typically associated with a system that draws a negative pressure through the tubing to pull exhaust gases out of the enclosed work space. But it could also simply convey the exhaust gases through a port to the atmosphere outside the enclosed workspace.

The apparatus and method of the invention are used to position the inner end of the length 14 of flexible corrugated tubing in operative alignment with the exhaust pipe 13. The apparatus includes as its basic components, an adapter or boot 15, a suction cup 16 and a length 17 of security cord.

The boot 15 is formed of elastomeric material and has a rearward end 18 formed with helical corrugations so as to provide a threaded socket for the inner end of the length 14 of flexible, helically corrugated tubing. The other end 19 (front end) of the boot 15 is flared outwardly to provide an enlarged opening that may be positioned in contact with the rear of the vehicle such that the enlarged opening surrounds the exhaust pipe 13 and is thus able to receive and convey exhaust gases therefrom. In this operative state, the exhaust gases pass through the boot 15 to the length 14 of flexible corrugated tubing. As noted above, conventionally a fan (not illustrated) is utilized to draw a negative pressure through the length 14 of flexible tubing away from the exhaust pipe 13, so that exhaust conveyed through the exhaust pipe 13 is withdrawn from the immediate atmosphere surrounding the vehicle and the confined space within which the vehicle is located and vented to an outside location.

Figure 2:
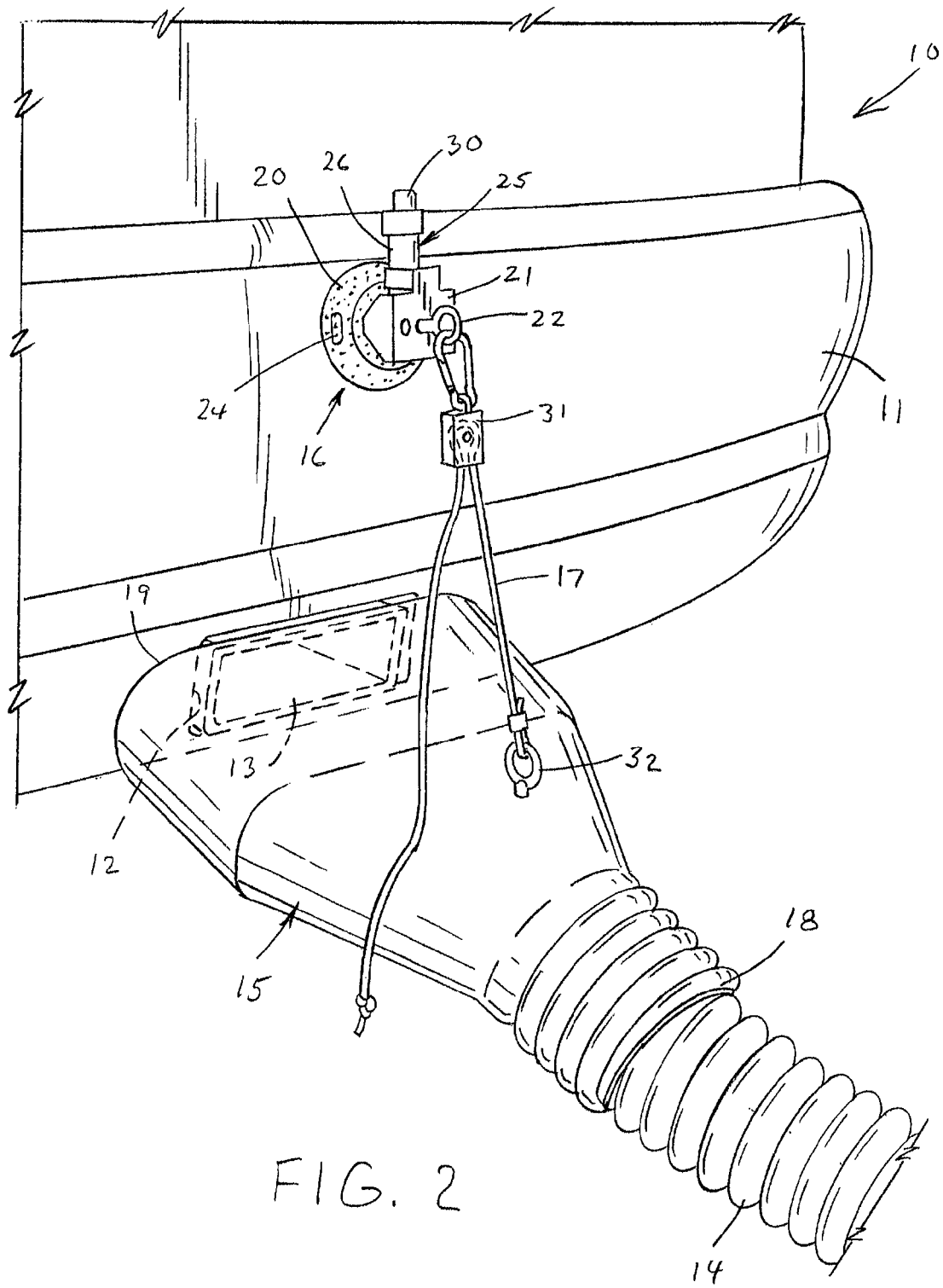
FIG. 2 is a perspective view showing the exemplary apparatus of FIG. 1 in an assembled, operational state.
Figure 3:
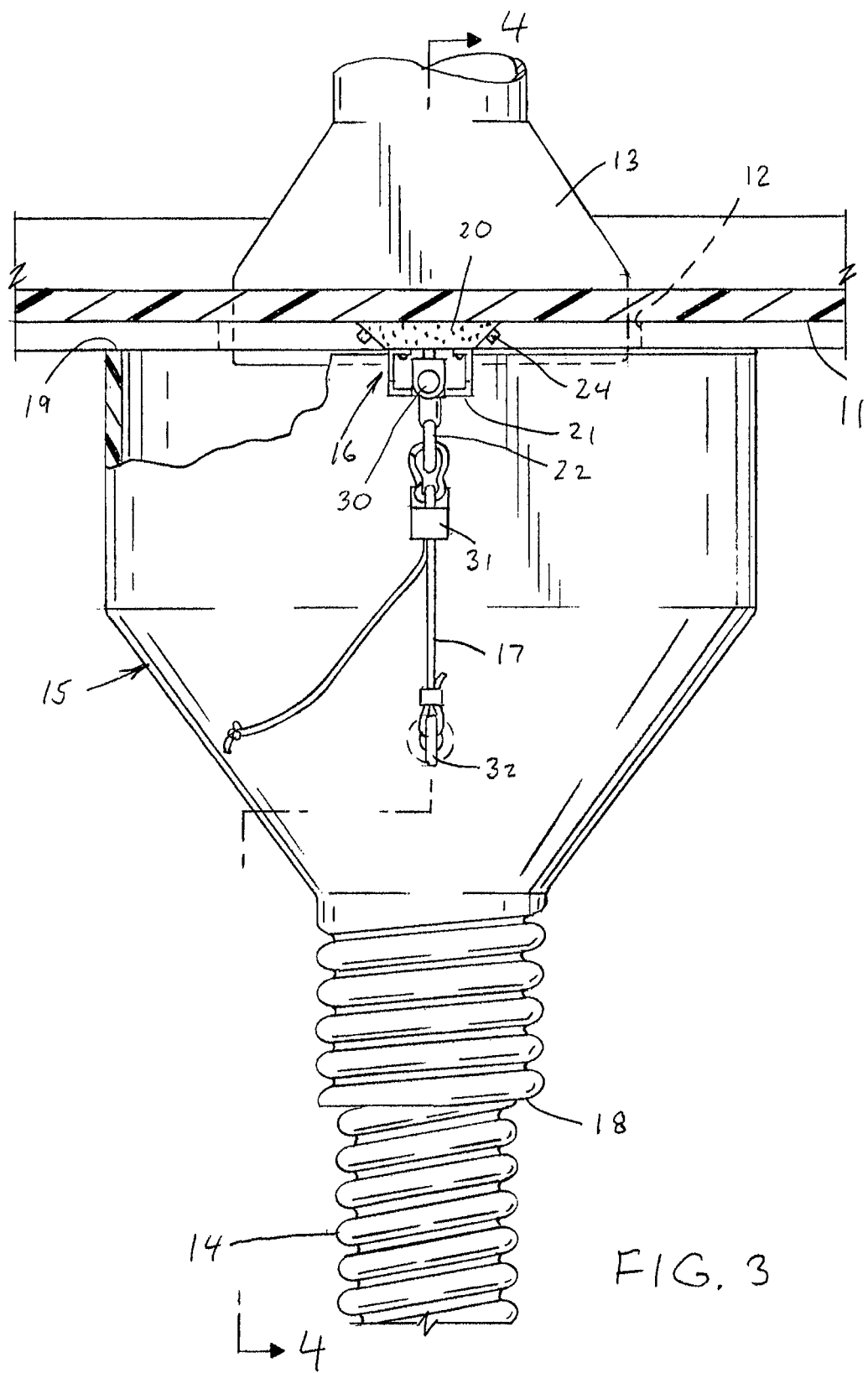
FIG. 3 is a top plan view of the apparatus of FIGS. 1 and 2 in the operational state.
Figure 4:
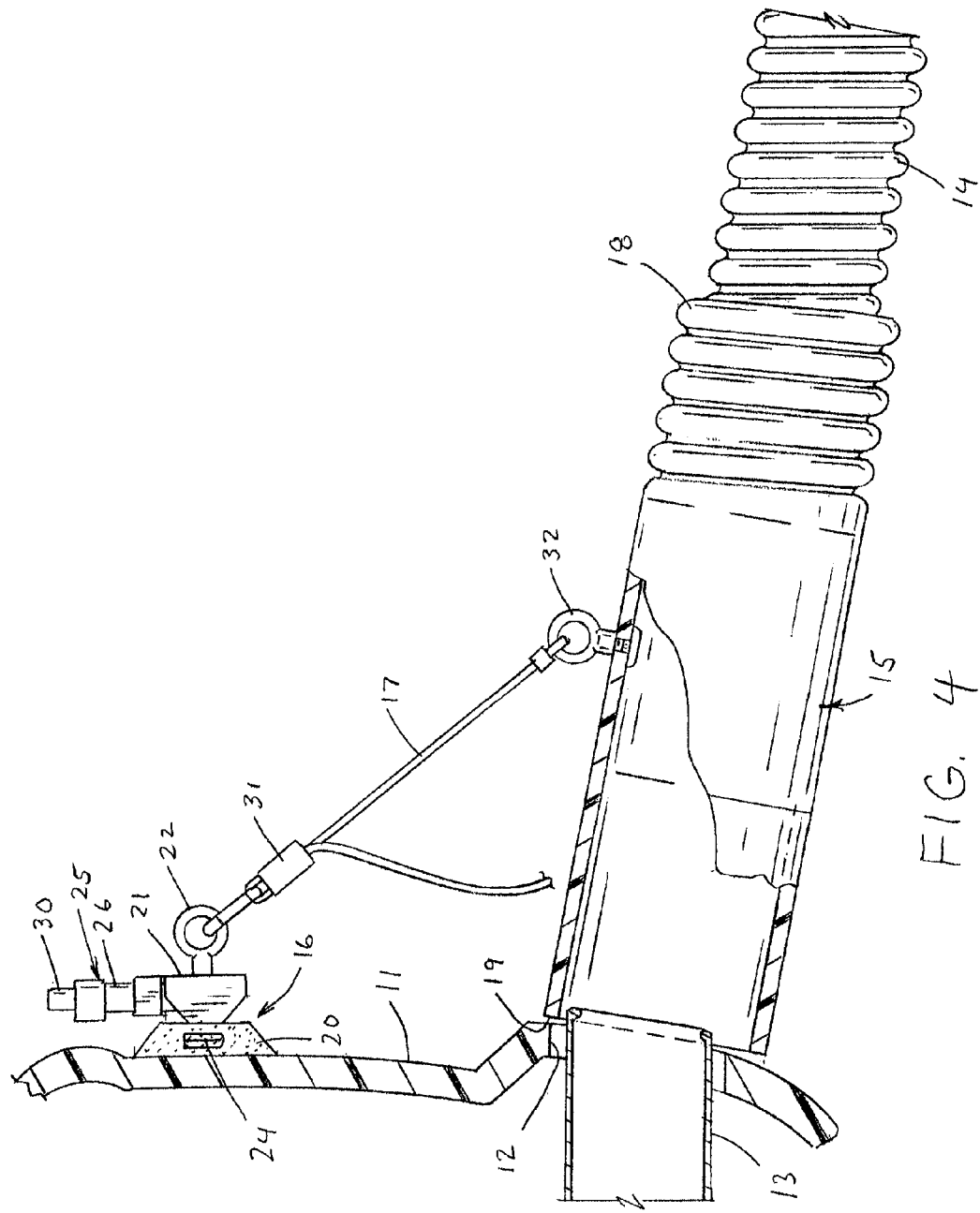
FIG. 4 is a fragmentary sectional view taken on the line 4-4 of FIG. 3 showing the method and apparatus of the invention and with parts broken away and shown in section.
Figure 5:
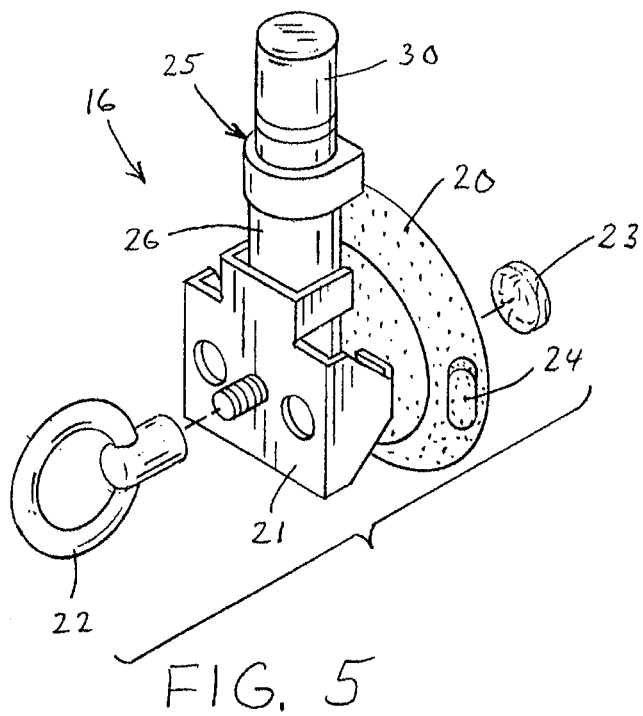
FIG. 5 is a perspective view showing a typical suction cup device suitable for use in connection with the invention.
Figure 6:
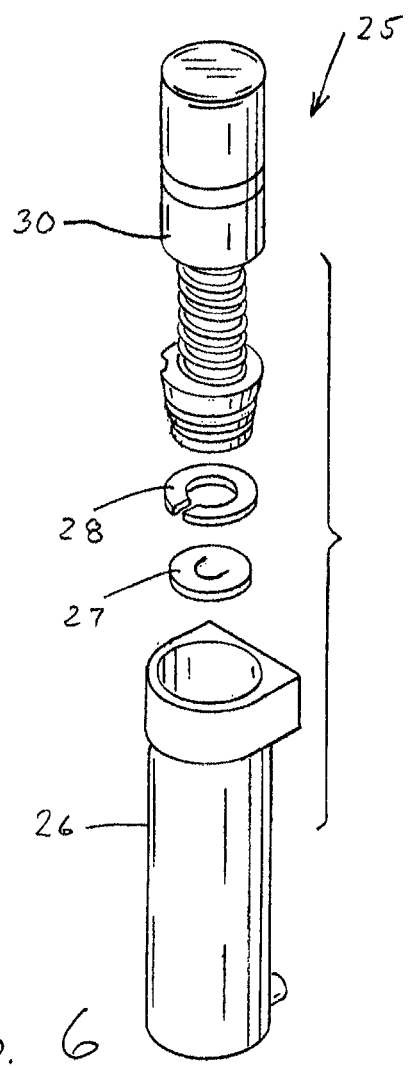
FIG. 6 is an exploded perspective view showing a pump assembly of the type used in connection with the suction cup device of FIG. 5.

In order to assure that the boot 15 remains securely positioned relative to the exhaust pipe 13, the apparatus includes a suction cup 16 that is releasably securable to the rear bumper or other generally flat surface on the rear portion of the vehicle 10 above the exhaust pipe, as best shown in FIG. 2. The suction cup 16 is best shown in FIG. 5. The illustrated embodiment of the suction cup 16 is commercially available from Powr-Grip Co. of Laurel, Mont. (e.g., Model No. TL3AMB), but suction cups from other manufacturers could be utilized in the invention. In the embodiment of the invention shown and described herein, the suction cup 16 is secured to a surface portion of the rear bumper 11 at a location just above the boot 15 and the exhaust pipe the boot 15 is aligned with. However, the suction cup 16 could be secured to any substantially flat portion of the vehicle 10 (e.g., the back glass, trunk, rear door etc.).

The suction cup 16 preferably includes a vacuum pad 20 that makes air tight contact with the respective surface portion of the vehicle. The suction cup also includes a body 21, a handle 22 and an air filter 23. In order to remove the suction cup 16 from the vehicle 10, a release tab 24 may be provided to permit the air seal to be broken, thus admitting air to the vacuum chamber defined in part by the vacuum pad 20. It will be appreciated that a vacuum release element may be incorporated in the pump or other portion of the suction device.

The suction cup also preferably includes a pump assembly 25 to create at least a partial vacuum in the vacuum chamber. The pump assembly includes a cylinder 26, a check valve 27, a retainer 28 and a plunger 30. When the plunger 30 is depressed (i.e. extended), air is expelled from the vacuum chamber, after which the vacuum pad 20 is pressed against the underlying surface portion of the vehicle. Then the plunger is released and urged by spring pressure to its retracted position. This serves to create at least a partial vacuum in the vacuum chamber and tightly secures the suction cup to the surface.

The length 17 of security cord is connected between an attachment point 32 of the boot 15 and the suction cup 16 as shown in FIGS. 1-4. When the cord is tensioned, it urges the boot 15 toward the rear bumper 11 surrounding the exhaust pipe 13 to assure that the boot 15 remains in a reasonably tightly secured and aligned position. A friction-type keeper 31 is located on the length 17 of cord to permit the cord to be tightened and retained in a tightened condition. The angles created by the placement of the attachment point 32 in the boot 15 and the suction cup 16 urge the boot 15 into contact with the rear of the vehicle surrounding the opening through which the exhaust gases are conveyed.

In some cases a vehicle's rear bumper may have two openings to accommodate two exhaust pipes, each pipe being aligned with one of the openings. In that case, two boots are required, but by attaching a relatively short length of flexible tubing to each of them, the short lengths may be connected to a "Y" adapter which in turn is connected to a single, much longer tube length. In this way a single long length of tubing may be used to convey the exhaust gases from both exhaust pipes to outside atmosphere.

While the invention has been shown and described with respect to a specific embodiment thereof, this is intended for the purpose of illustration rather than limitation and other variations and modifications of the specific embodiment herein shown and described will be apparent to those skilled in the art, all within the spirit and scope of the invention. Accordingly, the patent is not to be limited in scope and effect to the specific embodiment herein shown and described, or in any other way that is inconsistent with the extent to which the progress in the art has been advanced by the invention.

What is claimed is:

1. An apparatus for attachment to an automotive vehicle having a rear bumper defining at least one opening aligned with an exhaust pipe, the apparatus comprising:
   a length of helical, corrugated flexible tubing;
   a boot having a forward end and a rear end, the rear end being fluidly connected to an end of the length of tubing;
   a suction cup device configured for releasable attachment to a rear panel of the vehicle at a location above the exhaust pipe;
   a flexible security cord extending between the boot and the suction cup device; and
   a gripping device connected to the cord, the gripping device configured to retain the flexible security cord in a tensioned condition in which the boot is suspended solely from the suction cup device with the forward end of the boot contacting the rear bumper of the automotive vehicle and surrounding the opening such that any exhaust gases emanating from the exhaust pipe are conveyed through the boot and tubing.

2. The apparatus according to claim 1, wherein the suction device further comprises a release tab for breaking an air seal between the suction cup device and the automotive vehicle.

3. The apparatus according to claim 1, wherein the suction cup device includes a vacuum chamber and a manually operated pump for producing at least a partial vacuum in the vacuum chamber.

4. The apparatus according to claim 3, wherein the suction cup device further comprises a vacuum release element as part of the manually operated pump for breaking an air seal between the suction cup device and the automotive vehicle.

5. The apparatus according to claim 1, wherein the gripping device is a friction-type keeper.

6. A method for conveying any exhaust gases emanating from an exhaust pipe of an automotive vehicle located in an enclosed space for discharge to an atmosphere outside the enclosed space, the vehicle having a rear bumper defining at least one opening aligned with the exhaust pipe, the method comprising:
   providing an apparatus according to claim 1;
   securing the suction cup device to a rear panel of the automotive vehicle at a location above the exhaust pipe;
   tensioning the flexible security cord into a condition wherein the boot is suspended solely from the suction cup device with the forward end of the boot in contact with the rear bumper and surrounding the opening in the rear bumper; and
   retaining the cord in the condition with the gripping device such that any exhaust gases emanating from the exhaust pipe are conveyed through the boot and tubing for discharge to the atmosphere outside the enclosed space.

* * * * *